Figure 1:
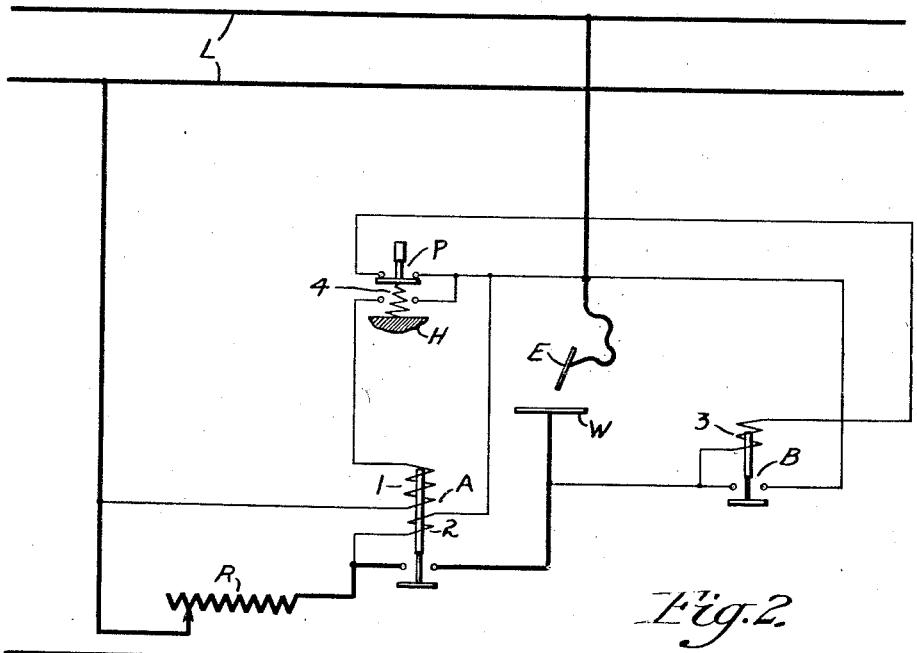

A. M. CANDY.
ELECTRIC ARC WELDING SYSTEM.
APPLICATION FILED SEPT. 7, 1917.

1,320,123.

Patented Oct. 28, 1919.

WITNESSES:
T. R. Krear
E. L. Greenewald

INVENTOR
Albert M Candy
BY
Wesley G. Carr
ATTORNEY

UNITED STATES PATENT OFFICE.

ALBERT M. CANDY, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC-ARC-WELDING SYSTEM.

1,320,123.   Specification of Letters Patent.   Patented Oct. 28, 1919.

Application filed September 7, 1917. Serial No. 190,133.

*To all whom it may concern:*

Be it known that I, ALBERT M. CANDY, a citizen of the United States, and a resident of Wilkinsburg, in the county of Allegheny and State of Pennsylvania, have invented a new and useful Improvement in Electric-Arc-Welding Systems, of which the following is a specification.

This invention relates to electric-arc welding and more particularly to a system of control for the welding circuit and auxiliary circuits.

In arc welding work, where several arc or welding circuits receive current from a single supply circuit, it has been found necessary to provide means for preventing the conditions in any one arc circuit from materially interfering with, or affecting the operation of, any other arc circuits connected to the same supply circuit. The principal object of my invention is, therefore, to provide an electric-arc welding system in which each arc circuit connected to a common supply circuit is substantially independent of the other arc circuits connected to the same supply circuit.

Another object of my invention is to provide a semi-automatic control equipment for each arc welding circuit that will act automatically to prevent the arc from reaching a potential above a predetermined maximum but which the welder may keep in an inoperative position for a short interval after the arc has been drawn so that he may steady the welding tool and obtain the desired length of arc without interference by the automatic controlling means.

The above and other objects and the novel features of my invention will be apparent from the following description, taken in connection with the drawing that forms a part of this application and in which—

Figure 2:
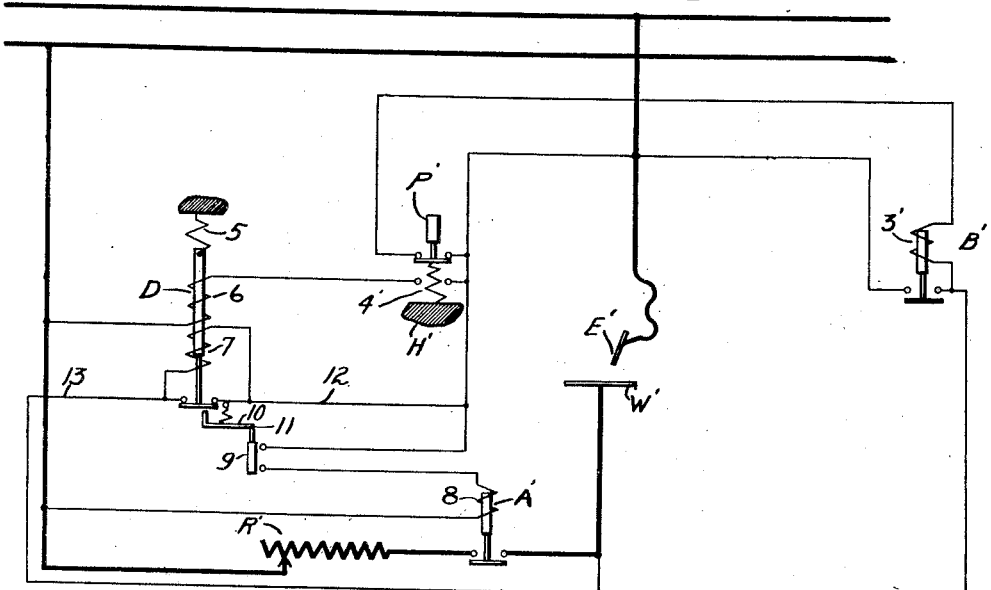

Figure 1 is a diagram illustrating an arc welding system embodying my invention, and Fig. 2 is a diagram illustrating a modification of the welding system disclosed in Fig. 1.

I have illustrated the invention as embodied in a constant-potential arc welding system but it will be understood that certain features are not limited to constant-potential systems but may be equally well embodied in other systems.

Referring to Fig. 1, L designates a supply circuit which is connected to any suitable source of constant-potential current and which may supply a plurality of arc welding circuits. The welding circuit proper contains a welding electrode E, the work W, a welding-circuit line switch A and an adjustable resistor R. The line switch A is in that branch of the circuit connected to the work W so that, normally, the work will be disconnected from the source of current and there will, therefore, be no danger of damaging the work if the operator accidentally places or drops the live electrode E on the work.

The line switch A is magnetically operated, the operating means consisting of a coil 1 which is connected, at one end thereof, to the supply circuit and, at the other end thereof, to a contact of a push-button switch P located upon the electrode holder H, or at any convenient position near the operator. The line switch A is also provided with a holding coil 2 which is normally energized and has sufficient power to hold the switch A in closed position after the same has been closed by the action of the coil 1; and a sufficient potential exists between the electrode E and the work W.

During the welding operation, there is danger that the operator will operate the arc at a potential greater than the potential which will produce the best results and not injure the work. With a constant-potential direct-current circuit, the voltage of which is 60 to 75 volts, the range for the arc voltage should be from 18 to about 30 or 40 volts. In order to limit the operation of the apparatus above a certain arc voltage, I have provided a shunting switch B which has an actuating coil 3 connected, at one end, to the welding circuit between the work W and the line switch A and, at the other end, to a contact terminal of the push-botton switch P. The shunting switch B is arranged so that it operates only when the voltage across the arc between the electrode E and the work W reaches a predetermined value, and the switch is adjustable, so that it can be set for any desired limiting-arc voltage.

The switches A and B are both held open normally by gravity and a spring 4 normally holds the push-button switch P so that it connects the coil 3 in shunt to the welding circuit.

With the parts in the positions shown in

Fig. 1, the operation is briefly as follows: to start welding, the operator depresses the push-button switch P, thus establishing a circuit through the coil 1 of the switch A, which completes the welding circuit. The coil 2 of the switch A is normally energized and will then maintain the line switch in a closed position during the welding operation and until the operator wishes to stop welding or until he draws an arc that exceeds the predetermined voltage for which the shunting switch B is adjusted. After the switch A closes, the operator touches the electrode E to the work W and immediately draws the arc between the electrode E and the work W, in the usual manner. The instant that the arc is drawn, there is a decided fluctuation of the arc voltage in the local welding circuit which has a tendency to unsteady the arc. After this is overcome and after the arc is practically steady, the operator releases the push-button switch P, and the coil 3 of the shunting switch B is automatically inserted in shunt to the arc. Now, if the operator removes the electrode E a sufficient distance away from the work W to produce an arc of predetermined voltage, the switch B will immediately be closed and short circuit the arc. The switch B also short circuits the holding coil 2 of the switch A and the switch A is thus released, opening the welding circuit, which, in turn, releases the switch B. Under normal operation, the operator will not cause the shunting switch B to close, but, when he wishes to cease welding, he will touch the electrode E to the work W momentarily, which short circuits the holding coil 2 of the line switch A. This causes the release of the line switch A and opens the welding circuit, and then the electrode E is immediately removed from the work W before it sticks thereto.

It will be seen that the system may be operated without the short-circuiting switch B, as this switch serves as a protecting switch to prevent the operator from operating an arc potential which is too high for satisfactory results.

The gravity-operated switches A and B may, under some conditions, not operate positively and in the proper order. For example, if the line switch A acts too slowly after the short-circuiting switch B has closed, and, in the meantime, the switch B opens again before the switch A opens, the work W will still be connected to the supply circuit and, upon withdrawing the electrode E, an arc will again be drawn between the electrode E and the work W. In order to avoid this condition, I have shown, in Fig. 2, an additional switch D which is normally held closed by a spring 5. The switch D also has an opening coil 6 and a holding coil 7, the coil 6 being controlled by the push-button switch P and the holding coil 7 being connected across the switch contacts and adapted to hold the switch D in open position after the coil 6 has acted to open the latter and a sufficient potential exists between electrode E and work W. The line switch $A^1$ has a coil 8, the circuit of which is controlled by the contact device 9. The contact device 9 is carried by a lever 10 pivoted at 11 and has an arm engageable by a part of the switch D whereby the circuit of the coil 8 is closed when the switch D is opened. The remaining elements of the system of Fig. 2 are similar to, and act in the same manner as, the corresponding elements of Fig. 1.

The operation of the system shown in Fig. 2 is briefly as follows: To start welding, the operator depresses the push-button switch $P^1$. This energizes the coil 6 of the switch D, causing the latter to open the circuit which it controls and also to close the contact device 9 which controls the circuit of the coil 8 of the line switch $A^1$. This causes the line switch $A^1$ to complete the welding circuit. The electrode $E^1$ is then touched to the work W and the arc drawn in the usual manner, and when steadied the push-button switch $P^1$ is released. The coil $3^1$ of the short-circuiting switch $B^1$ is then rendered active and it will only operate the switch $B^1$ when the voltage across the arc exceeds a predetermined value. When the switch $B^1$ closes, it short circuits the arc and also short circuits the holding coil 7 of the switch D, and then the spring 5, being under tension, immediately closes the switch D and permits the contact device 9 on the lever 10 to return to its initial position, opening the circuit of the coil 8 and releasing the line switch $A^1$. The positive closing of the switch D by the spring 5 positively and permanently short circuits the arc, since the wires 12 and 13 of the circuit controlled by the switch D are connected to opposite sides of the arc. The circuit of the coil 8 is also positively interrupted to release the line switch $A^1$. In this arrangement, it is immaterial how quickly or in what order the switches $A^1$ and $B^1$ open and it will be impossible to draw an arc automatically when the electrode E is moved away from the work.

It will be understood that various changes may be made in the systems shown and described without departing from my invention and, therefore, I do not wish to be limited to the exact details shown, except as defined in the appended claims.

I claim as my invention:

1. In electric-arc welding, the combination with a constant-potential welding circuit including a welding electrode and the work, of electro-responsive means for closing the welding circuit externally of the arc before said electrode is moved into contact with the work, and other means for maintaining the welding circuit after the arc is drawn between said electrode and said work.

2. In electric-arc welding, the combination with a welding circuit including a welding electrode and the work, of a switch in said welding circuit controlling the flow of current therethrough, electro-responsive means for closing said switch, and other electro-responsive means for maintaining said switch in closed position after the arc is drawn and after the first electro-responsive means becomes inactive, said other means being adapted to be rendered inactive by direct engagement of the work by said electrode, to thereby release said switch and open the welding circuit.

3. In electric-arc welding, the combination with a constant-potential welding circuit including a welding electrode and the work, of a switch in said welding circuit controlling the flow of current therethrough, electro-responsive means controllable by the operator for closing said switch, and other electro-responsive means for holding said switch in closed position after the first electro-responsive means is released and after the arc is drawn, the direct engagement of said work by said electrode being adapted to short circuit said other electro-responsive means, thereby releasing said switch and opening the welding circuit.

4. In electric-arc welding, the combination with a constant-potential welding circuit including a welding electrode and the work, of electro-responsive means for closing the welding circuit, other means for maintaining the welding circuit after the arc is drawn and during normal welding voltage across the arc, and means rendered operative at a predetermined voltage across the arc to shunt the current around the arc and release said other means to open the welding circuit.

5. In electric-arc welding, the combination with a welding circuit including a welding electrode and the work, of means for shunting the current around the arc at a predetermined voltage across the arc, and means for rendering said shunting means inoperable for an interval after the arc is drawn.

6. In electric-arc welding, the combination of a welding arc connected in a constant-potential circuit, electro-responsive means controlled by the voltage across the arc to shunt the current around the arc at a predetermined voltage, and means whereby the operator may control the action of said shunting means so as to render the same inoperative for an interval after the arc is drawn and until the arc is comparatively steady.

7. In electric-arc welding, the combination with a welding circuit including a welding electrode, the work, and a line switch controlling the flow of current in said circuit, electro-responsive means for operating said switch to close the welding circuit, electro-responsive means for shunting the current around the arc at a predetermined voltage across the arc, and means for controlling the shunting means and the line-switch operating means, adapted to render the latter operable and to prevent the operation of the shunting means for an interval of time.

8. In electric-arc welding, the combination with a welding circuit including a welding electrode, the work, and a line switch controlling the flow of current in said circuit, electro-responsive means for operating said switch to close the welding circuit, electro-responsive means for shunting the current around the arc at a predetermined voltage across the arc, means controlled by the operator for controlling the action of the shunting means and the line-switch operating means and adapted to render the latter operable to start the welding operation and to prevent the action of tne shunting means for an interval until the arc becomes comparatively steady, and means for holding said line switch in closed condition until said shunting means operates to shunt the current around the arc.

9. In electric-arc welding, the combination with a welding circuit including a welding electrode, the work and a line switch controlling the flow of current in said circuit, electro-responsive means for operating said line switch, electro-responsive means for shunting the current around the arc at a predetermined voltage across the arc, a two-position switch for controlling both said line switch operating means and said shunting means, said two-position switch being initially in a position to close the circuit of the shunting means but being movable to cause the circuit of the line-switch operating means to close and to temporarily open the circuit of the shunting means, and means tending to restore the two-position switch to its initial position.

10. In electric-arc welding, the combination with a welding circuit including an electrode, the work and a welding-circuit line switch normally interrupting the flow of current in said circuit, electro-responsive means for operating said switch, a second normally closed switch adapted, on opening movement, to render said electro-responsive means operative to close said welding circuit, means for opening said second switch, means for holding said second switch open after the same has been opened, and means for shunting the current around the arc at a predetermined voltage across the arc.

11. In electric-arc welding, the combination with a welding circuit including an electrode, the work and a line switch controlling the flow of current through said welding circuit, of means for temporarily short-circuiting the arc at a predetermined voltage across the arc, and other means controlled by the temporary short-circuiting means for permanently short-circuiting the arc.

12. In electric-arc welding, the combination with a constant-potential welding circuit including an electrode, the work and a line switch controlling the flow of current through said welding circuit, of means for temporarily short circuiting the arc at a predetermined voltage across the arc, other means controlled by the temporary short-circuiting means for permanently short-circuiting the arc, and means whereby the short-circuiting action of said other means releases said line switch and opens the welding circuit.

In testimony whereof I have hereunto subscribed my name this 30th day of August 1917.

ALBERT M. CANDY.